United States Patent
He

(10) Patent No.: US 12,308,772 B2
(45) Date of Patent: May 20, 2025

(54) LINEAR MOTOR DRIVING METHOD AND CIRCUIT AND RELATED APPARATUS

(71) Applicant: Honor Device Co., Ltd., Shenzhen (CN)

(72) Inventor: Wenqin He, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/044,118

(22) PCT Filed: Aug. 30, 2022

(86) PCT No.: PCT/CN2022/115743
§ 371 (c)(1),
(2) Date: Mar. 6, 2023

(87) PCT Pub. No.: WO2023/077930
PCT Pub. Date: May 11, 2023

(65) Prior Publication Data
US 2024/0283383 A1 Aug. 22, 2024

(30) Foreign Application Priority Data

Nov. 5, 2021 (CN) .......................... 202111307964.7

(51) Int. Cl.
*H02P 25/034* (2016.01)
(52) U.S. Cl.
CPC .................................. *H02P 25/034* (2016.02)
(58) Field of Classification Search
CPC ..................................................... H02P 25/034
(Continued)

(56) References Cited

U.S. PATENT DOCUMENTS 10,804,785 B2    10/2020  Liu et al.
2021/0339594 A1*  11/2021  Wang ................. B60G 17/0152

FOREIGN PATENT DOCUMENTS

CN    105026752 A  * 11/2015   ............... F03G 3/08
CN    105172507 A    12/2015
(Continued)

OTHER PUBLICATIONS

Kou Farong, Theory and technology of active control of automobile vibration, Huazhong University of Science and Technology, Jun. 30, 2021, pp. 4-7.
(Continued)

*Primary Examiner* — Kawing Chan
(74) *Attorney, Agent, or Firm* — Slater Matsil, LLP

(57) ABSTRACT

A linear motor driving method and circuit and a related apparatus are provided. The method is applied to a linear motor driving circuit. According to the method, the power supply module can supply power to the driver module and the control module, so that the control module can control the driver module to start and drive the linear motor to operate, so as to allow an electronic device to produce a vibration effect; and then the control module can control the driver module to turn off and stop driving the linear motor. However, the linear motor will continue to make damped vibration due to inertia. Specifically, a coil of the linear motor generates an induced electromotive force during vibration. Therefore, after the driver module is turned off, the control module will also control the energy recovery module to recover electric energy generated by the damped vibration of the linear motor.

20 Claims, 9 Drawing Sheets

(58) Field of Classification Search
USPC .......................................................... 318/114
See application file for complete search history.

(56) References Cited

FOREIGN PATENT DOCUMENTS

| | | | |
|---|---|---|---|
| CN | 105226748 | A | 1/2016 |
| CN | 105696250 | A | 6/2016 |
| CN | 105865555 | A | 8/2016 |
| CN | 206529611 | U * | 9/2017 |
| CN | 210327127 | U | 4/2020 |
| CN | 112555109 | A | 3/2021 |
| CN | 112653364 | A * | 4/2021 |
| JP | 2006197715 | A | 7/2006 |
| TW | 201944721 | A | 11/2019 |
| TW | I681618 | B | 1/2020 |
| TW | 202010239 | A | 3/2020 |

OTHER PUBLICATIONS

Gao Hanying, Motor Control, Harbin Institute of Technology Press, Mar. 31, 2018, pp. 96-99.

* cited by examiner

LINEAR MOTOR DRIVING METHOD AND CIRCUIT AND RELATED APPARATUS

CROSS-REFERENCE TO RELATED APPLICATIONS

This application is a national stage of International Application No. PCT/CN2022/115743, filed on Aug. 30, 2022, which claims priority to Chinese Patent Application No. 202111307964.7, filed on Nov. 5, 2021. The disclosures of each of the aforementioned applications are hereby incorporated by reference in their entireties.

TECHNICAL FIELD

This application relates to the field of hardware technologies, and in particular, to a linear motor driving method and circuit and a related apparatus.

BACKGROUND

More and more electronic products such as mobile phones, styluses, smartwatches, and bands are equipped with motors to provide users with vibration experience. Linear motors are widely used in various electronic products because of their good vibration effects. However, in a driving circuit of a linear motor used in a current electronic product, when the driving circuit stops driving and is disconnected, the linear motor will keep vibrating for a period of time due to inertia, and then will gradually stop motion under pure mechanical damping. Specifically, a coil of the linear motor generates an induced electromotive force during damped vibration. In this case, because the circuit is in a high impedance state or no loop is formed, the generated induced electromotive force is not used, resulting in energy waste.

Based on the foregoing problem, how to reduce electric energy losses of a linear motor driving apparatus, improve power supply efficiency of the circuit, and prolong standby time of the electronic product is an urgent problem to be resolved.

SUMMARY

This application provides a linear motor driving method and circuit and a related apparatus. According to the method, the linear motor driving circuit may recover electric energy generated by a linear motor during damped vibration, and supply the recovered electric energy to a low-power module such as a control module, so as to improve power supply efficiency of the circuit and reduce electric energy losses.

According to a first aspect, this application provides a linear motor driving circuit, and the linear motor driving circuit includes a control module, a driver module, a linear motor, and an energy recovery module; where when the control module controls the driver module to stop driving the linear motor to vibrate, the linear motor is configured to start damped vibration; and the control module is further configured to control the energy recovery module to collect electric energy generated by the linear motor during the damped vibration.

After the linear motor driving circuit according to the first aspect is used, the energy recovery module may be controlled to recover the electric energy generated by the linear motor during the damped vibration, so as to avoid energy waste. In addition, an induced electromotive force generated by the linear motor due to inertia forms a loop with the energy recovery circuit, so that the linear motor generates a counter electromotive force that hinders vibration and prevents the linear motor from continuing to vibrate, thereby shortening vibration trailing time of the linear motor, and making a vibration experience effect for a user more straightforward.

With reference to the linear motor driving circuit according to the first aspect, the energy recovery module is further configured to: after the energy recovery module collects the electric energy generated by the linear motor during the damped vibration, supply the collected electric energy to a first module; where the first module includes any one or more of the control module and another low-power chip.

In this way, the recovered electric energy may be supplied to another low-power module such as a control module, so as to improve power supply efficiency of the linear motor driving circuit, reduce electric energy losses, and prolong standby time.

With reference to the linear motor driving circuit according to the first aspect, the control module is further configured to: before the control module controls the driver module to stop driving the linear motor to vibrate, control the driver module to drive the linear motor to vibrate.

With reference to the linear motor driving circuit according to the first aspect, the energy recovery module includes a rectifier circuit and an energy storage circuit; where the rectifier circuit is configured to convert a collected first voltage generated by the linear motor during the damped vibration into a second voltage; the first voltage is a voltage with alternating positive and negative polarities and a variable amplitude; and the second voltage is a unidirectional pulsating direct current voltage with a constant polarity and a variable amplitude; and the energy storage circuit is configured to store the collected electric energy generated by the linear motor during the damped vibration.

In this way, recovered alternating positive and negative electromotive forces generated by the linear motor may be adjusted to a voltage with a positive polarity, that is, an alternating current voltage is converted into a direct current voltage, so as to supply an operating voltage to another circuit.

With reference to the linear motor driving circuit according to the first aspect, the energy recovery module further includes a filter circuit, and the filter circuit is configured to convert the second voltage output by the rectifier circuit into a third voltage; and a polarity of the third voltage is the same as that of the second voltage, and an amplitude variation coefficient of the third voltage is lower than that of the second voltage; alternatively, the energy recovery module further includes a boost circuit, and the boost circuit is configured to convert the second voltage into a fourth voltage; and a polarity of the fourth voltage is the same as that of the second voltage, and an amplitude of the fourth voltage is greater than that of the second voltage; alternatively, the energy recovery module further includes a filter circuit and a boost circuit, the filter circuit is configured to convert the second voltage output by the rectifier circuit into a third voltage, and then the boost circuit is configured to convert the third voltage into a fifth voltage; a polarity of the fifth voltage is the same as that of the third voltage, and an amplitude of the fifth voltage is greater than that of the third voltage; alternatively, the boost circuit is configured to convert the second voltage into a fourth voltage, and then the filter circuit is configured to convert the fourth voltage into a sixth voltage; and a polarity of the sixth voltage is the same as that of the fourth voltage, and an amplitude variation coefficient of the sixth voltage is lower than that of the fourth voltage.

In this way, the direct current voltage output by the rectifier circuit in the energy recovery circuit may be filtered, so as to smooth out an alternating current component therein and make the recovered electric energy more stable. In addition, the voltage may be boosted, so that the recovered electric energy is sufficient to support another circuit.

With reference to the linear motor driving circuit according to the first aspect, the rectifier circuit is specifically any one of the following: a full-wave rectifier and a half-wave rectifier; the energy storage circuit is specifically a capacitor, an inductor, a battery, or a circuit including a capacitor and an inductor that are connected in series or in parallel; the filter circuit is specifically any one of the following: a capacitor filter circuit, an inductor filter circuit, a Pi-type RC filter circuit, a Pi-type LC filter circuit, an active filter circuit, or an electronic filter circuit; and the boost circuit is specifically any one of the following: a boost DC/DC converter, a boost circuit, or a boost charge pump.

In this way, the linear motor driving circuit to which the method according to this application may be applied can be implemented in a plurality of manners, so as to further improve implementability of the method.

With reference to the linear motor driving circuit according to the first aspect, the driver module and the rectifier module are integrated in the same electronic circuit or independently disposed in different electronic circuits.

In this way, the linear motor driving circuit to which the method according to this application may be applied can be integrated in a circuit in a plurality of manners, so as to further improve implementability of the method.

According to a second aspect, this application provides a linear motor driving method, where the method is applied to a linear motor driving circuit, and the linear motor driving circuit includes a control module, a driver module, a linear motor, and an energy recovery module. The method includes: controlling, by the control module, the driver module to stop driving the linear motor to vibrate, where the linear motor starts damped vibration after stopping being driven; and controlling, by the control module, the energy recovery module to collect electric energy generated by the linear motor during the damped vibration.

After the linear motor driving method according to the second aspect is performed, the energy recovery module may be controlled to recover the electric energy generated by the linear motor during the damped vibration, so as to avoid energy waste. In addition, an induced electromotive force generated by the linear motor due to inertia forms a loop with the energy recovery circuit, so that the linear motor generates a counter electromotive force that hinders vibration and prevents the linear motor from continuing to vibrate, thereby shortening vibration trailing time of the linear motor, and making a vibration experience effect for a user more straightforward.

With reference to the linear motor driving method according to the second aspect, after the energy recovery module collects the electric energy generated by the linear motor during the damped vibration, the method further includes: supplying, by the energy recovery module, the collected electric energy to a first module; where the first module includes any one or more of the control module and another low-power chip.

In this way, the recovered electric energy may be supplied to another low-power module such as a control module, so as to improve power supply efficiency of the linear motor driving circuit, reduce electric energy losses, and prolong standby time.

With reference to the linear motor driving method according to the second aspect, before the controlling, by the control module, the driver module to stop driving the linear motor to vibrate, the method further includes: the control module controls the driver module to start, and the driver module drives the linear motor to vibrate.

With reference to the linear motor driving method according to the second aspect, the energy recovery module includes a rectifier circuit and an energy storage circuit; and that the energy recovery module collects the electric energy generated by the linear motor during the damped vibration specifically includes: the rectifier circuit converts a collected first voltage generated by the linear motor during the damped vibration into a second voltage; the first voltage is a voltage with alternating positive and negative polarities and a variable amplitude; and the second voltage is a unidirectional pulsating direct current voltage with a constant polarity and a variable amplitude; and the energy storage circuit is configured to store the collected electric energy generated by the linear motor during the damped vibration.

In this way, recovered alternating positive and negative electromotive forces generated by the linear motor may be adjusted to a voltage with a positive polarity, that is, an alternating current voltage is converted into a direct current voltage, so as to supply an operating voltage to another circuit.

With reference to the linear motor driving method according to the second aspect, the energy recovery module further includes a filter circuit, and the filter circuit is configured to convert the second voltage output by the rectifier circuit into a third voltage; and a polarity of the third voltage is the same as that of the second voltage, and an amplitude variation coefficient of the third voltage is lower than that of the second voltage; alternatively, the energy recovery module further includes a boost circuit, and the boost circuit is configured to convert the second voltage into a fourth voltage; and a polarity of the fourth voltage is the same as that of the second voltage, and an amplitude of the fourth voltage is greater than that of the second voltage; alternatively, the energy recovery module further includes a filter circuit and a boost circuit, the filter circuit converts the second voltage output by the rectifier circuit into a third voltage, and then the boost circuit converts the third voltage into a fifth voltage; a polarity of the fifth voltage is the same as that of the third voltage, and an amplitude of the fifth voltage is greater than that of the third voltage; alternatively, the boost circuit converts the second voltage into a fourth voltage, and then the filter circuit converts the fourth voltage into a sixth voltage; and a polarity of the sixth voltage is the same as that of the fourth voltage, and an amplitude variation coefficient of the sixth voltage is lower than that of the fourth voltage.

In this way, the direct current voltage output by the rectifier circuit in the energy recovery circuit may be filtered, so as to smooth out an alternating current component therein and make the recovered electric energy more stable. In addition, the voltage may be boosted, so that the recovered electric energy is sufficient to support another circuit.

With reference to the linear motor driving method according to the second aspect, the rectifier circuit is specifically any one of the following: a full-wave rectifier and a half-wave rectifier; the energy storage circuit is specifically a capacitor, an inductor, a battery, or a circuit including a capacitor and an inductor that are connected in series or in parallel; the filter circuit is specifically any one of the following: a capacitor filter circuit, an inductor filter circuit, a Pi-type RC filter circuit, a Pi-type LC filter circuit, an active filter circuit, or an electronic filter circuit; and the boost circuit is specifically any one of the following: a boost DC/DC converter, a boost circuit, or a boost charge pump.

In this way, the linear motor driving circuit to which the method according to this application may be applied can be implemented in a plurality of manners, so as to further improve implementability of the method.

With reference to the linear motor driving method according to the second aspect, the driver module and the rectifier module are integrated in the same electronic circuit or independently disposed in different electronic circuits.

In this way, the linear motor driving circuit to which the method according to this application may be applied can be integrated in a circuit in a plurality of manners, so as to further improve implementability of the method.

According to a third aspect, this application provides a chip. The chip is applied to a linear motor driving circuit, the chip includes one or more processors, and the one or more processors are configured to invoke a computer instruction to enable the linear motor driving circuit to perform the method according to any one of implementations of the second aspect.

According to a fourth aspect, this application provides a computer-readable storage medium, including an instruction, where when the instruction is run on a linear motor driving circuit, the linear motor driving circuit is enabled to perform the method according to any one of implementations of the second aspect.

According to a fifth aspect, this application provides an electronic device, and the electronic device includes one or more processors, one or more memories, and a linear motor driving circuit; where the one or more memories are coupled to the one or more processors, the one or more memories are configured to store computer program code, the computer program code includes a computer instruction, and when the computer instruction is executed by the one or more processors, the electronic device is enabled to perform the method according to any one of implementations of the second aspect.

DETAILED DESCRIPTION OF ILLUSTRATIVE EMBODIMENTS

The following clearly describes technical solutions in embodiments of this application in detail with reference to accompanying drawings. In descriptions of embodiments of this application, unless otherwise specified, "/" means "or", for example, A/B may mean "A or B"; "and/or" used herein is only used to describe an association relationship between associated objects, and indicates that three relationships may exist. For example, "A and/or B" may indicate the following three cases: Only A exists, both A and B exist, and only B exists.

The following terms "first" and "second" are merely intended for descriptive purposes, and shall not be understood as an indication or implication of relative importance or an implicit indication of a quantity of indicated technical features. Therefore, features defined with "first" and "second" may explicitly or implicitly include one or more of such features. In the descriptions of the embodiments of this application, unless otherwise stated, "a plurality of" means two or more.

In this application, referring to "an embodiment" means that specific features, structures or features described with reference to the embodiment may be included in at least one embodiment of this application. The phrase appearing at various locations in the specification does not necessarily refer to a same embodiment, nor is it a separate or alternative embodiment mutually exclusive with another embodiment. A person skilled in the art explicitly and implicitly understands that the described embodiments in this application may be combined with another embodiment.

Currently, more and more products are equipped with linear motor apparatuses. Compared with rotor motors widely used in electronic products in early days, linear motors can bring better vibration experience to users. Specifically, a linear motor mainly includes a stator and a rotator, the rotator mainly includes a special mass block, a spring, and a magnet; and the stator includes a flexible printed circuit board (Flexible Printed Circuit board) FPC and a winding coil. When the linear motor receives a driving signal, a stator coil in the linear motor is electrified. Due to existence of a magnetic field, based on magnetic effect of current discovered by Oersted, a physicist, under an action of a magnetic field force, the stator will drive the rotator to move in a specific direction, such as a transverse direction, that is, a left-right direction, so as to produce a sense of vibration. It can be learned that an operating principle of the linear motor is similar to that of a pile driver. The linear motor mainly converts electric energy into mechanical energy, directly converts electric energy into mechanical energy for linear motion, and drives a spring mass block to perform linear motion, so as to produce vibration. Such vibration gives a user a sense of vibration similar to an effect of "takh-takh-takh".

Figure 1:
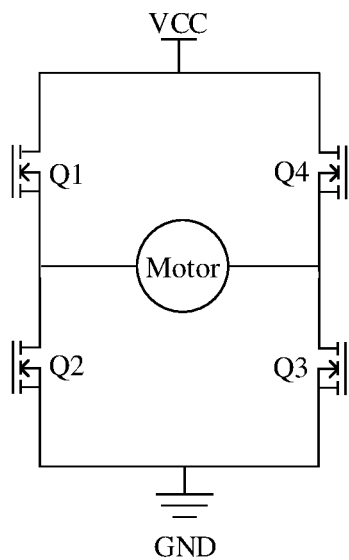
FIG. 1 is a topology diagram of a linear motor driving circuit according to an embodiment of this application.

Referring to FIG. 1, FIG. 1 is a schematic diagram of an example of a linear motor driving circuit in an electronic product.

As shown in FIG. 1, the driving circuit includes a power supply, an H-bridge circuit, a linear motor, and the like. The power supply supplies power to an H-bridge, so that the H-bridge can drive the linear motor to operate. The following describes an operating principle for driving the linear motor by the H-bridge in detail.

When Q1 and Q3 are turned on, and Q2 and Q4 are turned off, the linear motor moves to the right, and the direction of motion is denoted as a positive direction.

When Q1 and Q3 are turned off, and Q2 and Q4 are turned on, the linear motor moves to the left, and the direction of motion is denoted as a negative direction.

When Q1 and Q2 are turned on, and Q3 and Q4 are turned off, it is equivalent to a short circuit of the power supply, and the power supply will be burned, which does not occur under a normal condition.

When Q1, Q2, Q3 and Q4 are turned off, it is considered that the linear motor is in an "idle" state. Specifically, an electromotive force generated by the linear motor due to inertia will not form a loop, so that an Ampere force that hinders motion will not be generated, and the linear motor will move for a long time due to inertia.

According to a schematic diagram of a circuit of a linear motor apparatus shown in FIG. 1, the linear motor apparatus only includes a driving circuit. When the driving circuit is powered off, that is, Q1, Q2, Q3 and Q4 are turned off, the linear motor will keep side-to-side vibration due to inertia. However, because an induced electromotive force generated by vibration cannot form a loop (that is, the circuit is in a high impedance state), and the induced electromotive force is not used, the linear motor will gradually stop vibration under pure mechanical damping.

To resolve technical problems of the linear motor driving circuit shown in FIG. 1, this application provides a linear motor driving method and circuit and a related apparatus. The method is applied to an electronic device, and the driving circuit includes a power supply module, a control module, a driver module, a linear motor, and an energy recovery module. According to the method, the power supply module can supply power to the driver module and the control module, so that the control module can control the driver module to start and drive the linear motor to operate, so as to allow an electronic device to produce a vibration effect; and then the control module can control the driver module to turn off and stop driving the linear motor. However, the linear motor will continue to make damped vibration due to inertia. Specifically, a coil of the linear motor generates an induced electromotive force during vibration. Therefore, after the driver module is turned off, the control module will also control the energy recovery module to operate, that is, recover electric energy generated by the linear motor during the damped vibration. Then the recovered electric energy is supplied to a low-power module such as a control module, so as to improve power supply efficiency of the electronic device, reduce electric energy losses, and prolong standby time.

Figure 2:
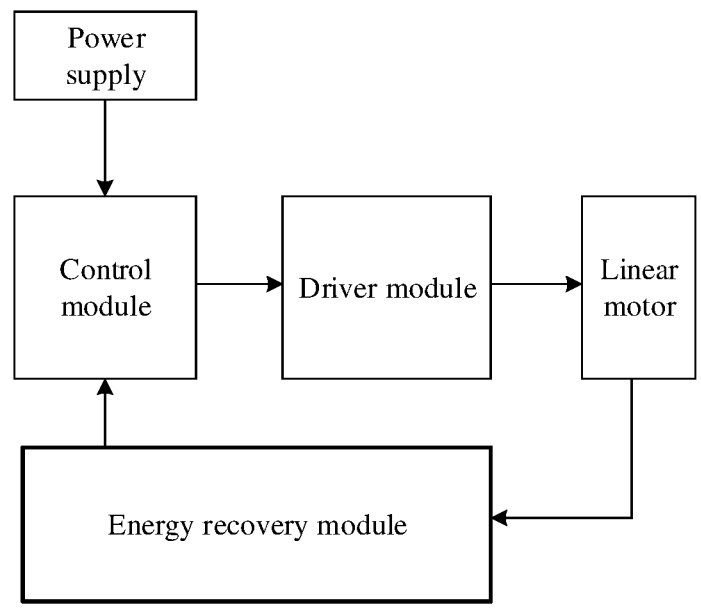
FIG. 2 is a schematic diagram of a linear motor driving apparatus according to an embodiment of this application.

With reference to FIG. 2, the following describes a schematic diagram of a linear motor driving apparatus according to an embodiment of this application.

As shown in FIG. 2, the linear motor driving apparatus includes a power supply, a control module, a driver module, a linear motor, and an energy recovery module. An output end of the power supply is connected to an input end of the control module, an output end of the control module is connected to an input end of the driver module, an output end of the driver module is connected to the linear motor, and the output end of the driver module is also connected to the energy recovery module; and an output end of the energy recovery module is connected to, for example, the input end of the control module, another low-power circuit module in the electronic device, or the like.

The power supply is configured to supply an operating voltage to the linear motor driving apparatus. Specifically, the output end of the power supply is connected to the input end of the control module, and the control module can control the driver module to operate, so as to drive the linear motor to vibrate.

The control module is configured to output a signal source, so as to control the driver module to operate. A signal waveform output by the control module may be PWM, another low frequency driving signal, or the like. This is not limited in this embodiment of this application.

A specific implementation of the driver module may be any one of the following drivers and amplifiers: a half-bridge (BTL) driver, a full-bridge driver, a Class D (Class D) amplifier, a Class H (Class H) amplifier, a Class AB (Class AB) amplifier, and the like. This is not limited in this embodiment of this application.

The linear motor is a motor with a specific vibration direction described previously. Details are not described herein again.

The energy recovery module may be configured to: when the linear motor continues to make damped vibration due to inertia after the driver module is turned off, collect an induced electromotive force generated by a motor coil cutting magnetic induction lines in a magnetic field. A specific circuit structure of the energy recovery module will be described in detail below. Details are not described herein. It should be noted that, in some other embodiments of this application, the energy recovery module is further configured to recover energy in another scenario. Specifically, using an electronic product such as a mobile phone and a band as an example, when a motor configured to produce a vibration effect in the electronic product is shaken by an external factor, such as a hand-held electronic product of a user, rather than being driven by a driving circuit to vibrate, a mass block in the motor also shakes under an external force and start to vibrate. In this case, the energy recovery module can also recover generated energy.

It may be understood that FIG. 2 is only a schematic diagram of an example of basic modules included in a linear motor driving apparatus. In some embodiments of this application, each module included in the linear motor driving apparatus shown in FIG. 2 also includes a circuit with more functions. For details, refer to FIG. 3.

It may be understood that each module included in the linear motor driving apparatus shown in FIG. 2 is only an example. In some other embodiments of this application, the driving apparatus may further include more modules, and names of the modules are only examples. For example, the driver module may be referred to as a driving module. This is not limited in this embodiment of this application. Functions of the modules have been described above, and a specific implementation circuit of each module will be described in detail below.

In some other embodiments of this application, each module shown in FIG. 2 may be split into one or more other modules. For details, refer to FIG. 3.

Figure 3:
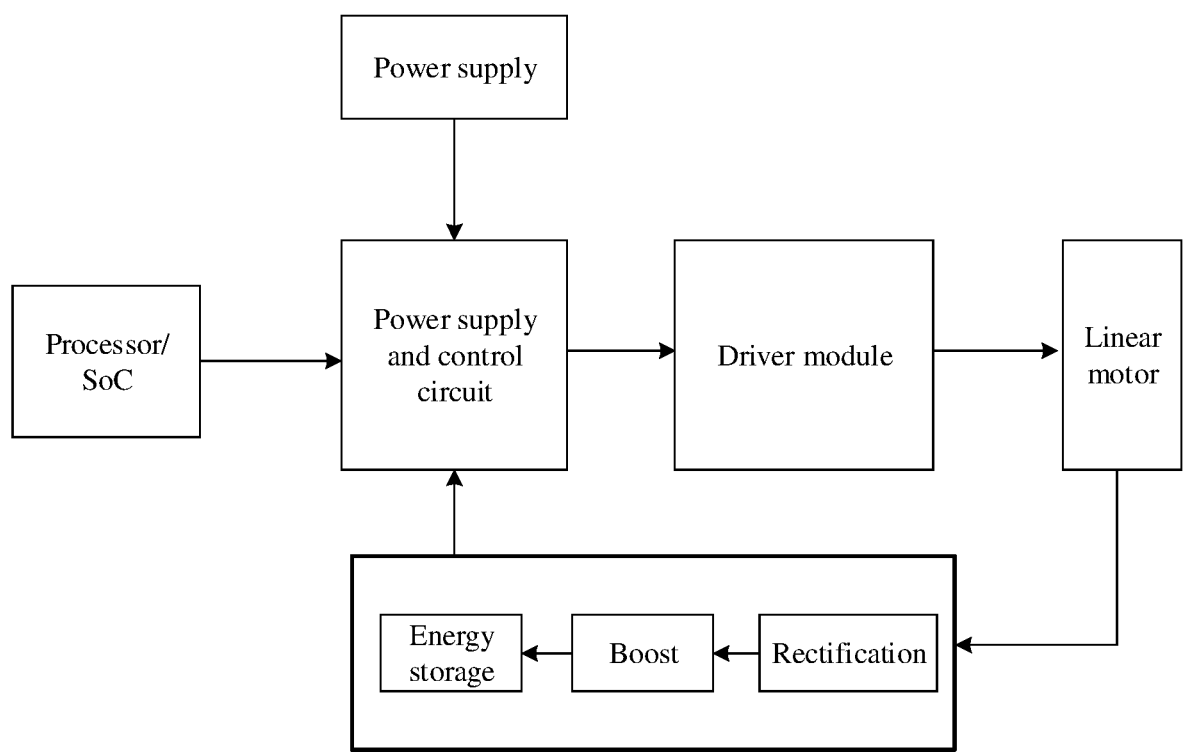
FIG. 3 is a schematic diagram of another linear motor driving apparatus according to an embodiment of this application.

As shown in FIG. 3, the foregoing control module may further include a processor/system on chip (System on Chip, SoC), and a control and power supply circuit. The control and power supply circuit may be an integrated circuit on the same chip or an integrated circuit on different chips. This is not limited in this embodiment of this application.

The foregoing energy recovery module may further include a rectifier circuit, a filter circuit, a boost circuit, an energy storage circuit, and the like. The rectifier circuit and the energy storage circuit are electronic circuits that need to be included in the energy recovery module, while the filter circuit and the boost circuit are optional electronic circuits in the energy recovery module. The energy storage circuit is connected as a last-stage electronic circuit in the energy recovery module. The rectifier circuit is connected as a first-stage electronic circuit in the energy recovery module; and an output end of the rectifier circuit may be connected to the filter circuit and then connected to the boost circuit, or may be connected to the boost circuit and then connected to the filter circuit. This is not limited in this embodiment of this application. The following describes functions of circuits in the energy recovery module in a situation in which an energy recovery module is formed by sequentially connecting a rectifier circuit, a filter circuit, a boost circuit, and an energy storage circuit in series. A sequence principle of another series connection is similar, and details are not described herein again.

Specifically, the rectifier circuit may use various forms such as a half-wave rectifier and a full-wave rectifier. This is not limited in this embodiment of this application. A function of the rectifier circuit is to transform an alternating current voltage into a unidirectional pulsating direct current voltage. The alternating current voltage is a voltage whose amplitude and polarity change over time, and the unidirectional pulsating direct current voltage is a direct current voltage whose magnitude changes over time, but polarity does not change. In this embodiment of this application, an input voltage of the rectifier circuit is an induced electromotive force with alternating positive and negative polarities generated by the linear motor during damped vibration, that is, an induced current in a loop is an alternating current. Because the alternating current voltage generated by the linear motor cannot be directly supplied to another electronic circuit in the electronic device, the alternating current voltage needs to be converted into a direct current voltage by the rectifier circuit before being supplied to the another electronic circuit. Therefore, an output voltage of the rectifier circuit is a rectified voltage with a constant polarity. A diagram showing simulation of voltage waveforms at an input end and an output end of the rectifier circuit will be described in detail in the diagram showing simulation of a voltage shown in FIG. 4 below. Details are not described herein.

The filter circuit is configured to smooth out an alternating current component of collected electric energy. Specifically, because the rectifier circuit outputs a unidirectional pulsating direct current voltage, the filter circuit smooths out an alternating current component of the unidirectional pulsating direct current voltage as much as possible, to obtain a direct current voltage with a relatively stable voltage amplitude.

A function of the boost circuit is to convert a filtered low voltage into a high voltage for use by another electronic circuit. An implementation of the boost circuit may be any one of the following: a boost DC/DC converter, a boost circuit, a boost charge pump (Charge Pump), or the like. It may be understood that the boost module is an optional module, and existence of the boost circuit may be specifically determined based on a magnitude of a rectified voltage. For example, when a voltage value obtained through rectification is greater than a preset voltage, boosting is not required. The preset voltage is determined by an operating voltage of an electronic circuit module to be supplied by the energy storage circuit. Generally, the operating voltage of the electronic circuit module, such as the control circuit, is 0.8-1 V. A diagram showing simulation of a voltage waveform at an output end of the boost circuit will be described in detail in the diagram showing simulation of a voltage shown in FIG. 4 below. Details are not described herein.

An implementation of the energy storage circuit may be a capacitor, an inductor, an energy storage element including a capacitor and an inductor that are connected, in series, in parallel, or in another form, a battery, or the like. This is not limited in this embodiment of this application. Because vibration of the linear motor is periodic vibration, for example, the linear motor vibrates for one second, then stops vibrating for another second, and continues to vibrate for another second, a current recovered by the rectifier module is not constant, and is usually not suitable for being directly supplied to another electronic circuit. Therefore, an energy storage circuit is required to store recovered electric energy.

It may be understood that each module included in the linear motor driving apparatus shown in FIG. 3 is only an example. In some other embodiments of this application, the driving apparatus may further include more modules, and names of the modules are only examples. This is not limited in this embodiment of this application. Functions of the modules have been described above, and a specific implementation circuit of each module will be described in detail below.

Figure 4:
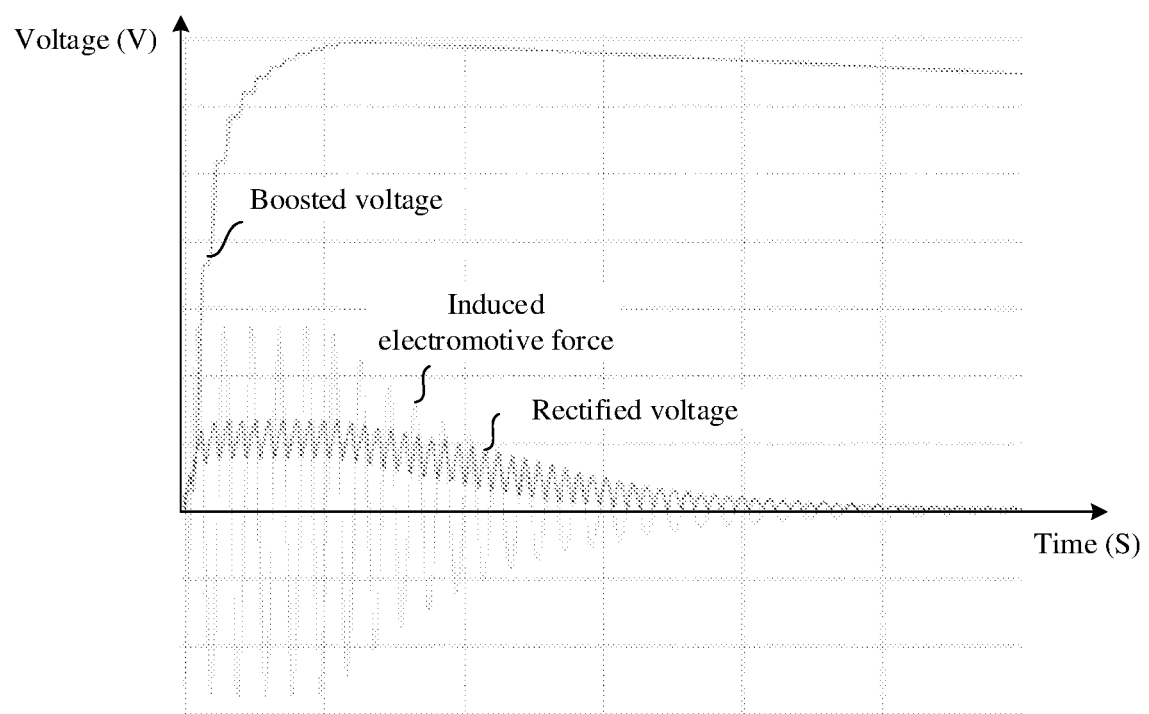
FIG. 4 is a diagram showing simulation of a voltage waveform in an energy recovery module that is generated by a linear motor during damped vibration according to an embodiment of this application.

With reference to a diagram showing simulation of voltage waveforms at different circuit positions in the energy recovery circuit shown in FIG. 4, the following further describes functions of the rectifier circuit and the boost circuit in the energy recovery circuit shown in FIG. 3.

FIG. 4 is a diagram showing an example of simulation of three output voltage waveforms: a waveform of an induced electromotive force, a waveform of a rectified voltage, and a waveform of a boosted voltage.

The waveform of an induced electromotive force is as follows: The linear motor generates an induced electromotive force during damped vibration; and after the linear motor is connected to the energy recovery module shown in FIG. 3, a voltage waveform detected at an input end of the energy recovery module, which is also an input end of the rectifier circuit, is the waveform of the induced electromotive force. It can be learned from FIG. 4 that a voltage amplitude of the induced electromotive force changes over time as sine and cosine waveforms along positive and negative axes, and amplitudes of the sine and cosine waveforms decrease gradually as damped vibration time of the linear motor increases. When the linear motor stops the damped vibration, the amplitude, namely, the induced electromotive force, drops to 0. Therefore, the waveform of the induced electromotive force is also an alternating current voltage waveform, which is determined by properties of the linear motor. Specifically, the linear motor is in a side-to-side vibration state, that is, a direction of motion of a coil in the linear motor in a magnetic field also changes alternately in positive and negative directions. Therefore, a polarity of the induced electromotive force generated by the linear motor also changes alternately in the positive and negative directions, so that the amplitude of the waveform of the induced electromotive force can be positive or negative. In addition, because the linear motor is affected by mechanical damping during vibration, an amplitude of side-to-side vibration will decrease gradually until the linear motor stops vibrating, so that a generated electromotive force will also decrease gradually to 0. Therefore, the amplitude of the waveform of the induced electromotive force will decrease gradually to 0 as damped vibration time increases.

The waveform of a rectified voltage is as follows: The linear motor generates an induced electromotive force during damped vibration; and after the linear motor is connected to the energy recovery module shown in FIG. 3, a voltage waveform detected at an output end of the rectifier circuit in the energy recovery module is the waveform of the rectified voltage. The rectified voltage is a voltage output after the induced electromotive force passes through the rectifier circuit. It can be learned from FIG. 4 that an amplitude of the rectified voltage fluctuates periodically along the positive axis, and the amplitude of the voltage waveform decreases gradually as damped vibration time of the linear motor increases. When the linear motor stops the damped vibration, the amplitude, namely, the voltage, drops to 0. Therefore, the waveform of the rectified voltage may also be referred to as a unidirectional pulsating direct current voltage, where "unidirectional" means that a voltage polarity is constant at all times, and "pulsating" means that the voltage fluctuates in magnitude, that is, the voltage waveform exhibits a periodic change in a timeline. By comparing the waveform of the induced electromotive force with the waveform of the rectified voltage, it can be learned that the rectifier circuit converts a negative part of an input induced electromotive force into a positive voltage, so as to convert an alternating current voltage into a direct current voltage. However, the direct current contains an alternating current component, the alternating current component is a part of the voltage with an unstable amplitude, and the alternating current component can be smoothed out by the filter circuit to obtain a stable direct current voltage. For a specific implementation of the rectifier circuit, refer to the following detailed description.

The waveform of a boosted voltage is as follows: The linear motor generates an induced electromotive force during damped vibration; and after the linear motor is connected to the energy recovery module shown in FIG. 3, a voltage waveform detected at an output end of the boost circuit in the energy recovery module is the waveform of the rectified voltage. The boosted voltage is a voltage output after the rectified voltage passes through the boost circuit. It can be learned from FIG. 4 that an amplitude of the boosted voltage changes over time into a relatively stable straight line. When the linear motor stops damped vibration, the voltage becomes 0. By comparing the waveform of the rectified voltage with the waveform of the boosted voltage, it can be learned that the boost circuit increases an amplitude of an input rectified voltage, so as to convert a low voltage into a high voltage. For a specific implementation of the rectifier circuit, refer to the following detailed description.

Figure 5A:
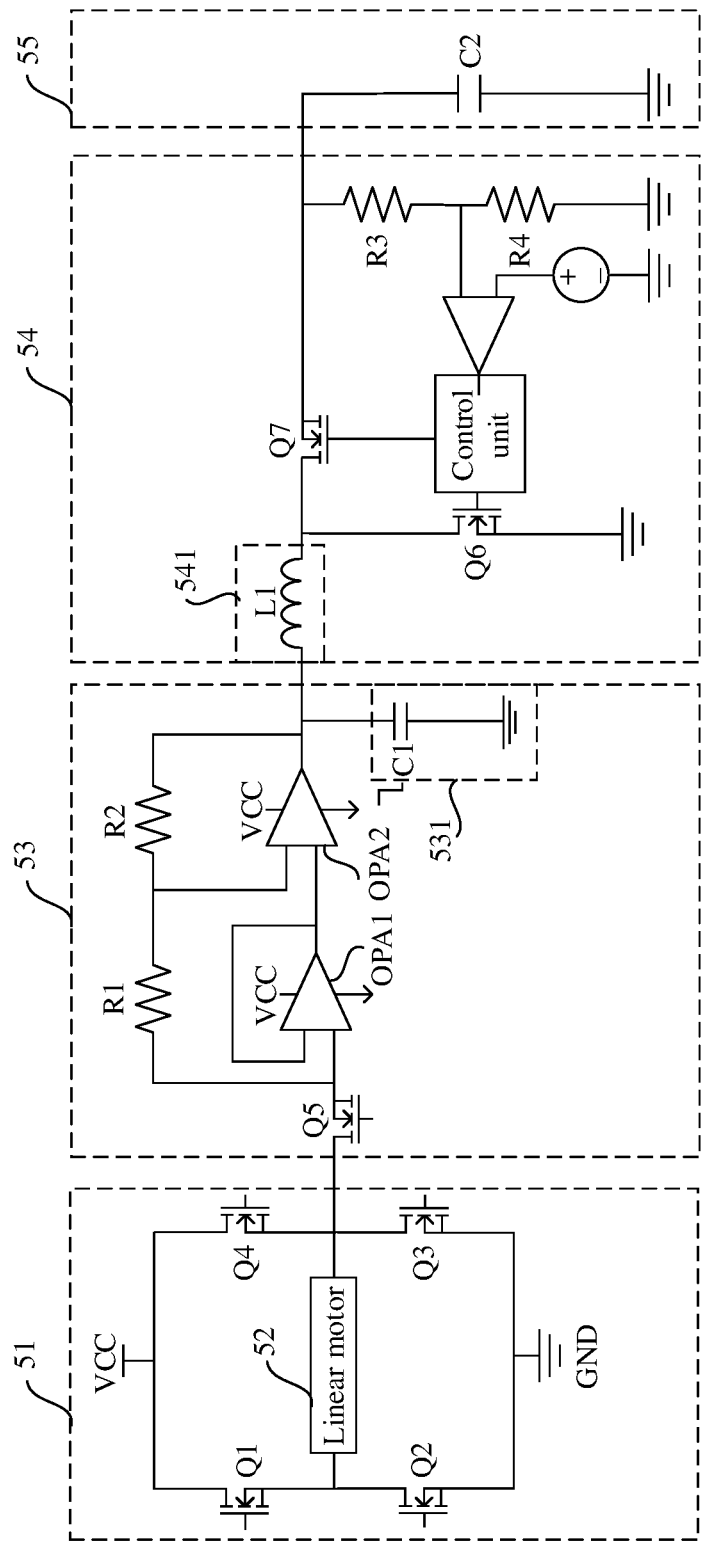
FIG. 5A is a topology diagram of a linear motor driving circuit according to an embodiment of this application.
Figure 6A:
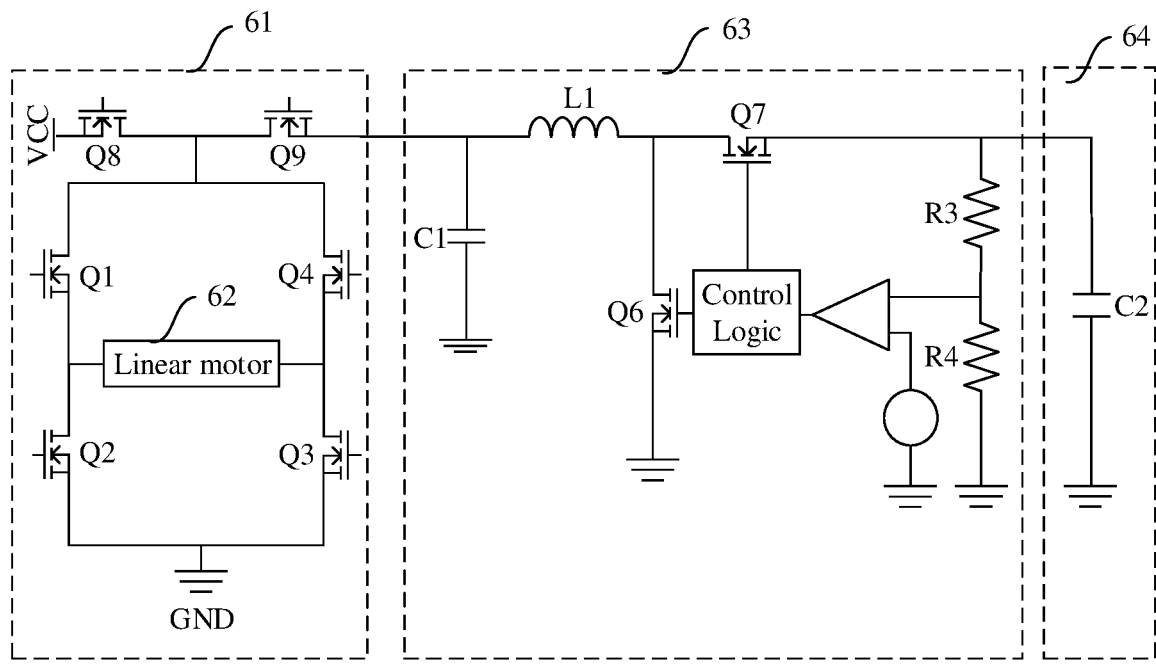
FIG. 6A is a topology diagram of another linear motor driving circuit according to an embodiment of this application.

Functions of the energy recovery module are described based on the linear motor driving apparatus described in FIG. 2 and FIG. 3, and the three voltage waveforms in the energy recovery circuit shown in FIG. 4. With reference to FIG. 5A and FIG. 6A, the following describes a specific circuit structure for implementing the foregoing functions.

It may be understood that modules or electronic circuits included in the linear motor driving apparatus may be integrated in the same electronic circuit or independently disposed in different electronic circuits. This is not limited in this embodiment of this application. The following describes specific circuit implementations of the linear motor driving apparatus according to this application by simply using an example in which the driver module and the rectifier circuit shown in FIG. 5A are independently disposed in different electronic circuits, and the driver module and the rectifier circuit shown in FIG. 6A are integrated in the same electronic circuit.

Circuit Implementation I

Referring to FIG. 5A, FIG. 5A shows an example of a structure of a linear motor driving circuit.

As shown in FIG. 5A, the structure of the linear motor driving circuit includes a driving circuit 51, a linear motor 52, a rectifier circuit 53, a boost circuit 54, and an energy storage circuit 55. The driving circuit 51 corresponds to the foregoing driver module; and the rectifier circuit 53, the boost circuit 54, and the energy storage circuit 55 correspond to the foregoing energy recovery module. An output end of the driving circuit 51 is connected to a linear motor, and is connected to an input end of the rectifier circuit 53 by using a switch Q5; an output end of the rectifier circuit 53 is connected to an input end of the boost circuit 54; and an output end of the boost circuit 54 is connected to an input end of the energy storage circuit.

The driving circuit 51 is similar to a letter "H", and therefore is referred to as an "H-bridge driver". The H-bridge driver includes four independently controlled switching components. Components that can be used as electronic switches in the circuit include a triode, a metal-oxide-semiconductor field-effect transistor (Metal-Oxide-Semiconductor Field-Effect Transistor, MOSFET), and the like. In addition, other switching elements in the driving circuit 51, such as Q4, Q5, Q6 and Q7, may also be triodes and MOSFETs. FIG. 5A shows only an example in which an MOSFET is used as a switching element, but this is not limited in this embodiment of this application.

An operating principle of the linear motor is similar to that described in FIG. 1. A processor can control a vibration process of the linear motor by controlling states of the four switching components of the H-bridge, as follows:

The processor can control an operating state of each switch by inputting a control signal to the switching components. When the control signal may be, for example, a pulse width modulation (PWM) signal:

First, a bias of a base of the triode or a gate of the MOSFET may be modulated by using the PWM signal, so as to turn on and turn off the triode or the MOSFET, namely, the four switching elements Q1-Q4. When the PWM signal is at a high level, the triode or the MOSFET is controlled to be turned on, and when the PWM signal is at a low level, the triode or the MOSFET is controlled to be turned off, so as to achieve a turn-on or turn-off state of the switching elements in each electronic circuit. In addition, turn-on and turn-off time of the triode or the MOSFET, namely, the four switching elements Q1-Q4, may be changed by adjusting a PWM duty cycle. The PWM duty cycle is a ratio of a high level in a pulse cycle to an entire cycle. For example, a duty cycle of a PWM wave at a high level for one second and a low level for one second is 50%. A higher duty cycle indicates a higher equivalent voltage across the linear motor, and correspondingly, a higher vibration speed and a higher vibration amplitude of the linear motor. Generally, a PWM frequency is 10 KHz~50 KHz. If the frequency is excessively low, a waveform fineness will be poor, and voltage waveforms will be rough, so that noise and abnormal sound will be produced easily. If the frequency is excessively high, efficiency of a system will be reduced due to switching losses of an MOS transistor.

It may be understood that signals used to control the switching components to be turned on and turned off are not limited to the foregoing PWM signal, but also include other forms of low frequency modulation signals. This is not limited in this embodiment of this application.

Figure 5B:
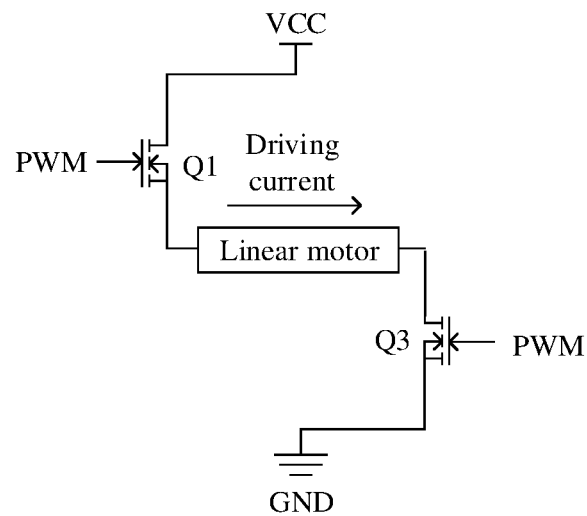
FIG. 5B is a topology diagram of an equivalent circuit of a linear motor driving circuit according to an embodiment of this application.
Figure 5C:
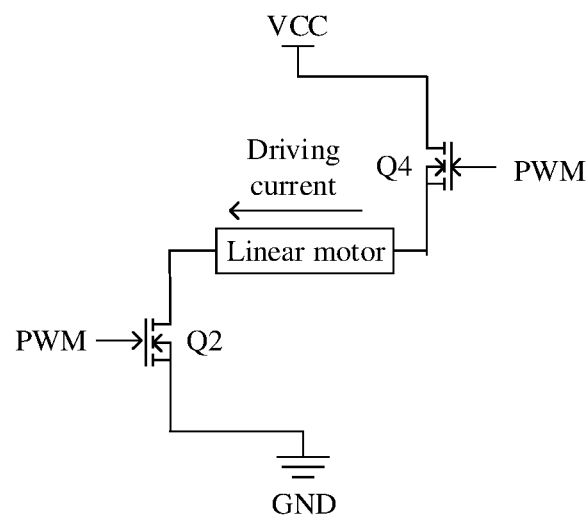
FIG. 5C is a topology diagram of an equivalent circuit of a linear motor driving circuit according to an embodiment of this application.

Next, with reference to FIG. 5B and FIG. 5C, FIG. 5B and FIG. 5C show examples of equivalent circuit diagrams in which a linear motor is driven to vibrate by controlling turn-on and turn-off of Q1-Q4 by using a PWM signal.

As shown in FIG. 5B, when a PWM signal is input to Q1 and Q3, and no PWM signal is input to Q2 and Q4, or a duty cycle of a PWM signal input to Q2 and Q4 is 0, an equivalent circuit of the driving circuit 51 is that Q1 and Q3 are turned on, and a branch where Q2 and Q4 are located is disconnected. A power supply voltage first passes through Q1, then flows from a left end to a right end of the linear motor, and is grounded through Q3, to supply a rightward driving current to the linear motor, so as to drive the linear motor to vibrate to the right.

As shown in FIG. 5C, when a PWM signal is input to Q2 and Q4, and no PWM signal is input to Q1 and Q3, or a duty cycle of a PWM signal input to Q1 and Q3 is 0, an equivalent circuit of the driving circuit 51 is that a branch where Q2 and Q4 are located is connected, and a branch where Q1 and Q3 are located is disconnected. A power supply voltage first passes through Q4, then flows from a right end to a left end of the linear motor, and is grounded through Q2, to supply a leftward driving current to the linear motor, so as to drive the linear motor to vibrate to the left.

A vibration speed of the linear motor is controlled by controlling the duty cycle of the PWM signal. A higher duty cycle of the PWM signal indicates a higher equivalent voltage (the power supply voltage multiplied by the duty cycle) applied to the linear motor for motion, and correspondingly, a higher vibration speed of the motor. When the duty cycle of the PWM signal is controlled to be 0, the switching elements are turned off, and voltage applied to the linear motor is 0, so as to stop driving the linear motor to stop vibration, but the linear motor makes damped vibration. The linear motor generates an induced electromotive force during the damped vibration.

First, an induced electromotive force generated by the linear motor due to inertia forms a loop with the energy recovery circuit, so that the linear motor generates a counter electromotive force that hinders vibration and prevents the linear motor from continuing to vibrate, thereby shortening vibration trailing time of the linear motor, and making a vibration experience effect for a user more straightforward.

In addition, an induced current generated by the linear motor during mechanical vibration will flow to the rectifier circuit of the energy recovery module through the switch Q5. The following describes an operating principle of the rectifier circuit in detail, as follows:

The rectifier circuit 53 mainly includes two-stage operational amplifier circuits OPA1 and OPA2, and two feedback resistors R1 and R2 with equal resistance. In particular, the operational amplifier circuits are specifically rail-to-rail operational amplifiers. The rail-to-rail operational amplifier is also referred to as a full-amplitude operational amplifier. An amplitude of an output voltage of this operational amplifier is very close to that of an input voltage when the operational amplifier is unloaded, while a maximum output amplitude of a common operational amplifier is about 2~3 V lower than the input voltage thereof.

A function of the OPA1 and the OPA2 is to convert alternating positive and negative induced electromotive forces generated by the linear motor 52 during damped vibration into a voltage that is always positive, as follows:

1. When an input voltage is a positive voltage, the OPA1 is equivalent to a follower, an amplification factor of the OPA1 is about 1, and an output voltage of the OPA1 is approximately equal to the input voltage. In this case, two input ends of the OPA2 are equipotential, so that a final output voltage of the OPA2 is equal to the input voltage.

2. When an input voltage is a negative voltage, an output voltage of the OPA1 is 0. Because the R1 and the R2 have the same resistance, the OPA2 is equivalent to an inverting amplifier with an amplification factor of −1. Therefore, a final output voltage of the OPA2 is equal to −1 times the input voltage.

It may be understood that the rectifier circuit 53 shown in FIG. 5A is only an example. A specific implementation of the rectifier circuit may also be another electronic circuit capable of adjusting a voltage with a variable polarity or a circuit with a variable flow direction into a voltage with a constant polarity or a current with a constant flow direction. This is not limited in this embodiment of this application.

In addition, because a voltage output by the rectifier circuit is the unidirectional pulsating direct current voltage shown in FIG. 4, the unidirectional pulsating direct current voltage may be decomposed into a direct current voltage and a set of alternating current voltages with different frequencies. The voltage is unstable in magnitude, and therefore cannot be directly used by an electronic circuit. Therefore, the output voltage needs to be filtered to eliminate an alternating current component of the voltage to obtain a direct current for use by the electronic circuit.

In a capacitor filter circuit 531 shown in FIG. 5A, an alternating current component is smoothed out by using a characteristic of "isolating direct current and conducting alternating current" of a capacitor C1. Specifically, a capacitor C1 is connected in parallel between the rectifier circuit and a load. Because the capacitor C1 is equivalent to an open circuit for a direct current, a direct current voltage output by the rectifier circuit cannot flow into a ground terminal through C1, but can only be applied to the load. The load herein may be regarded as the boost circuit 54 and the energy storage circuit 55 connected in parallel with C1. For an alternating current component output by the rectifier circuit, because C1 has a high capacity and a low capacitive reactance, the alternating current component flows to the ground terminal through C1, and cannot be applied to the load. In this way, a required direct current voltage is extracted from a unidirectional pulsating direct current by filtering through the capacitor C1. A higher capacity of the filter capacitor C1 indicates a lower capacitive reactance to the alternating current component, a smaller alternating current component remaining on the load, and a better filtering effect.

A structure of the filter circuit and components used are not limited in this application. In the filter circuit, components with special impedance characteristics to an alternating current, such as capacitors and inductors, are mainly used. The filter circuit mainly includes the following structures: a capacitor filter circuit, an inductor filter circuit, a Pi-type RC filter circuit, a Pi-type LC filter circuit, an active filter circuit, and an electronic filter circuit. In this application, only the capacitor filter circuit shown as an example in FIG. 5A is analyzed to extract an alternating current component through capacitive coupling.

Generally, an induced electromotive force generated by the linear motor during damped vibration is small, and a magnitude of a rectified voltage with an alternating current component removed by using the rectifier circuit is reduced again. In some embodiments, a low voltage output after rectification is insufficient to support operation of another electronic circuit. Therefore, the boost circuit 54 needs to be connected following the rectifier circuit 53.

The boost circuit 54 shown in FIG. 5A includes an inductor L1, MOSFET switching elements such as Q6 and Q7, a control unit, an OPA3, feedback resistors R3 and R4, a reference voltage, and the like.

A main function of the inductor L1 is to store energy. At a first stage, the inductor L1 can store energy output by the rectifier circuit, and then at a second stage, stored energy and the energy output by the rectifier circuit are superimposed and released to a subsequent circuit for amplification.

A control logic unit is configured to implement stable boost by controlling on-off states of Q6 and Q7. Specifically, at the first stage, when Q6 is controlled to be turned on and Q7 is controlled to be turned off, the inductor L1 is charged to the ground; and at the second stage, Q6 is controlled to be turned off and Q7 is controlled to be turned on. In this case, a voltage of the inductor is superimposed with a voltage output by a preceding rectifier to discharge the load, namely, an energy storage circuit C2, so as to implement boost.

The boost circuit 54 in FIG. 5A is only an example, and a structure of the boost circuit and components used are not limited in this application.

Because vibration of the linear motor is periodic vibration, for example, when an alarm clock or an incoming call prompt tone of the electronic device sounds, the linear motor will vibrate periodically with a ringing sound, for example, the linear motor vibrates for one second, then stops vibrating for another second, and continues to vibrate for another second until the alarm clock is turned off or the phone is hung up or is connected. For another example, when a new message prompt tone of the electronic device sounds, the linear motor will vibrate with the prompt tone for one second. It can be learned that electric energy generated by the linear motor during damped vibration each time after the driving circuit stops operating is not stable, so that, a current recovered by the rectifier module is not constant, and is usually not suitable for being directly supplied to another electronic circuit. Therefore, an energy storage circuit is required to store recovered electric energy.

The energy storage circuit 55 shown in FIG. 5A uses only a capacitor C2 as an example. The capacitor C2 can store electric energy supplied by the boost circuit 54 as electric field energy, and then release the energy back to the circuit during discharging, for example, supply electric energy to another electronic circuit (a power supply and control circuit module).

In some other embodiments of this application, in addition to the capacitor C2 shown in FIG. 5A, the energy storage circuit 55 may further include more energy storage elements such as a capacitor or an inductor. The inductor may further convert energy supplied by an amplifier circuit 54 into magnetic field energy in a period of time for storage, and then release the energy back to the circuit in another period of time, so as to supply electric energy to another electronic circuit (a power supply and control circuit module). Components and a structure of the energy storage circuit 55 are not limited in this embodiment of this application.

To simplify a structure of the linear motor driving circuit shown in FIG. 5A, a plurality of circuits included in the circuit structure shown in FIG. 5A may be integrated into one circuit module. For example, two functions of the driving circuit 51 and the rectifier circuit 53 in FIG. 5A are integrated into a circuit structure, so as to simplify components in the circuit, save costs, and reduce power consumption. It may be understood that the linear motor driving circuit according to this embodiment of this application may further integrate a plurality of other circuits into one circuit.

The following describes a second circuit implementation in detail based on that the two functions of the driving circuit 51 and the rectifier circuit 53 in FIG. 5A are integrated into a circuit structure.

Circuit Implementation II

Referring to FIG. 6A, FIG. 6A is a topology diagram of an example of another linear motor driving circuit.

As shown in FIG. 6A, a structure of the linear motor driving circuit includes a driving and rectifying circuit 61, a linear motor 62, a boost circuit 63, and an energy storage circuit 64. An output end of the driving and rectifying circuit 61 is connected to the linear motor 62, and is connected to an input end of the boost circuit 63 by using a switch Q6; and an output end of the boost circuit 63 is connected to an input end of the energy storage circuit 64.

It may be understood that the circuit structure shown in FIG. 6A differs from that shown in FIG. 5A in that the driving and rectifying circuit 61 in FIG. 6A can implement the two functions of the driving circuit 51 and the rectifier circuit 53 in FIG. 5A. The following describes only a circuit structure and an operating principle of the driving and rectifying circuit 61 in detail. For descriptions about a structure and an operating principle of another circuit, refer to the foregoing description of FIG. 5A. Details are not described herein again.

The driving and rectifying circuit 61 is still based on an "H-bridge driver", and specifically includes the "H-bridge driver" and two other switching components Q8 and Q9. The switching components Q8 and Q9 may be the same as the switching components Q1-Q4 in the foregoing "H-bridge driver", such as triodes or MOSFETs. FIG. 6A shows only an example in which an MOSFET is used as a switching component, but this is not limited in this embodiment of this application.

A processor can control a vibration process of the linear motor by controlling states of Q8 and the four switching components Q1-Q4 of the H-bridge, as follows:

First, when the processor controls Q8 to be turned on, the power supply supplies power to the driving circuit. Further, the processor can control an operating state of each switch by inputting a control signal to the switching components in the driving circuit. The control signal may be, for example, a PWM signal. For a principle of driving, by using the PWM signal, the linear motor to vibrate, refer to the foregoing description.

Figure 6B:
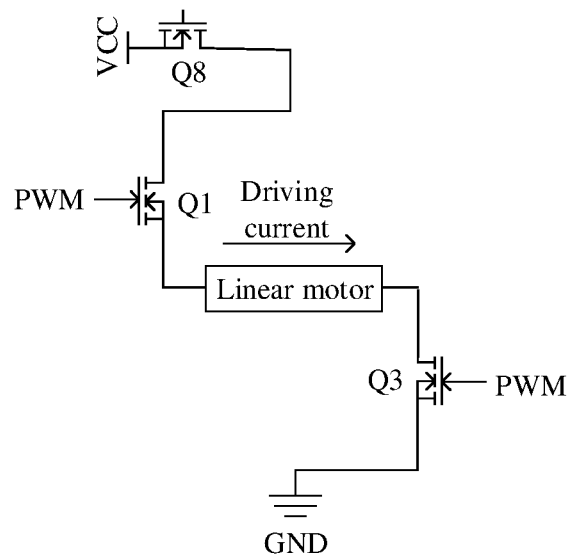
FIG. 6B is a topology diagram of an equivalent circuit of another linear motor driving circuit according to an embodiment of this application.
Figure 6C:
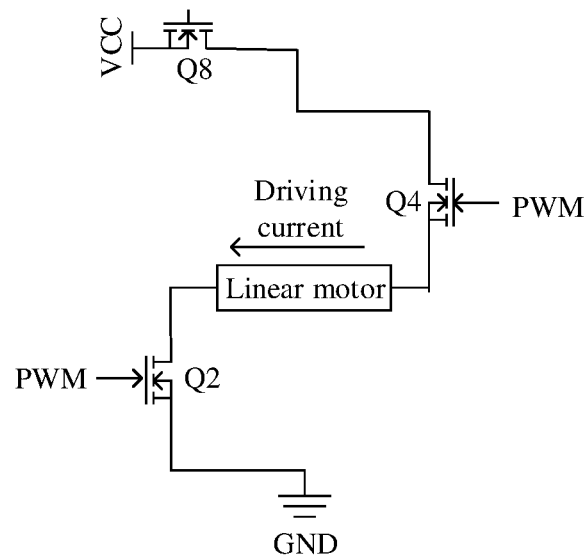
FIG. 6C is a topology diagram of an equivalent circuit of another linear motor driving circuit according to an embodiment of this application.

With reference to FIG. 6B and FIG. 6C, the following describes an equivalent circuit diagram in which a linear motor is driven to vibrate by controlling turn-on and turn-off of Q1-Q4, Q8 and Q9 by using a PWM signal.

As shown in FIG. 6B, if Q8 is controlled to be turned on and Q9 is controlled to be turned off, when a PWM signal is input to Q1 and Q3, and no PWM signal is input to Q2 and Q4, or a duty cycle of a PWM signal input to Q2 and Q4 is 0, an equivalent circuit of the driving and rectifying circuit 61 is that Q8, Q1 and Q3 are turned on, and a branch where Q2 and Q4 are located is disconnected. A power supply voltage first passes through Q8 and Q1, then flows from a left end to a right end of the linear motor, and is grounded through Q3, to supply a rightward driving current to the linear motor, so as to drive the linear motor to vibrate to the right.

As shown in FIG. 6C, if Q8 is controlled to be turned on and Q9 is controlled to be turned off, when a PWM signal is input to Q2 and Q4, and no PWM signal is input to Q1 and Q3, or a duty cycle of a PWM signal input to Q1 and Q3 is 0, an equivalent circuit of the driving and rectifying circuit 61 is that a branch where Q8, Q2 and Q4 are located is connected, and a branch where Q1 and Q3 are located is disconnected. A power supply voltage first passes through Q8 and Q4, then flows from a right end to a left end of the linear motor, and is grounded through Q2, to supply a leftward driving current to the linear motor, so as to drive the linear motor to vibrate to the left.

When the driving circuit stops operating, the linear motor starts to make damped vibration. The linear motor may generate alternating positive and negative induced electromotive forces during the damped vibration. Therefore, a rectifier circuit is needed to convert the alternating positive and negative induced electromotive forces into a voltage whose polarity is always positive. It should be noted that circuit components (not shown in FIG. 6A) capable of implementing voltage polarity detection, such as a zero-crossing detector 1, a zero-crossing detector 2, a voltage comparator, or an ADC zero-crossing detector, are disposed between two ends of the linear motor, that is, between Q1 and Q2, and between Q3 and Q4. A zero-crossing detector may use an operational amplifier, a transistor, or an optocoupler IC to implement a zero-crossing detection circuit. An implementation of zero-crossing detection is not limited in this embodiment of this application. The zero-crossing detector can detect changes of the induced electromotive forces from positive to negative and from negative to positive. When the induced electromotive forces are detected to change from negative to positive, an operating mode of the control circuit is described in FIG. 6D below; or when the induced electromotive forces are detected to change from positive to negative, an operating mode of the control circuit is described in FIG. 6E below.

Figure 6D:
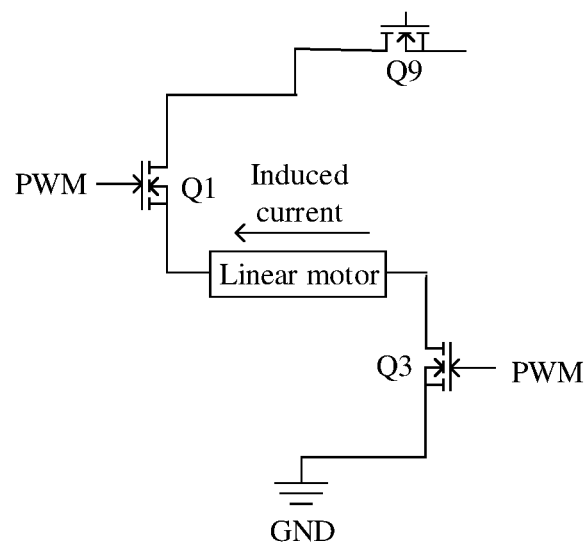
FIG. 6D is a topology diagram of an equivalent circuit of another linear motor driving circuit according to an embodiment of this application.
Figure 6E:
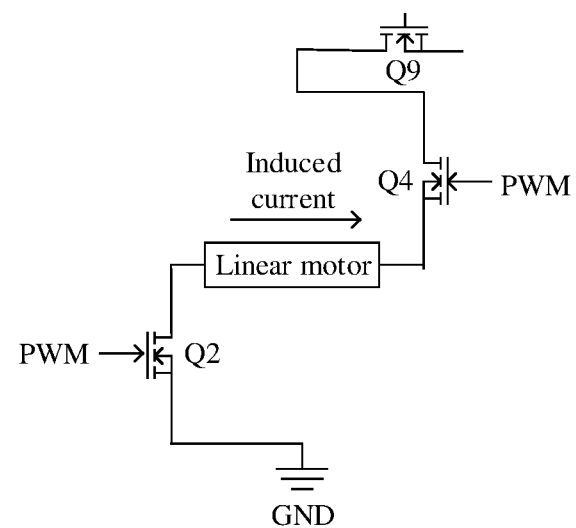
FIG. 6E is a topology diagram of an equivalent circuit of another linear motor driving circuit according to an embodiment of this application.

With reference to FIG. 6D and FIG. 6E, the following describes an equivalent circuit diagram in which rectification is implemented by controlling turn-on and turn-off of Q1-Q4, Q8 and Q9 by using a PWM signal.

Referring to FIG. 6D, FIG. 6D is a schematic diagram of an example of an equivalent circuit of a driving and rectifying circuit 61 when a zero-crossing detector detects that the linear motor generates a positive electromotive force (an electromotive force pointing to a left side of the linear motor is positive, and an electromotive force pointing to a right side of the linear motor is negative).

As shown in FIG. 6D, when Q9 is controlled to be turned on and Q8 is controlled to be turned off, Q1 and Q3 are controlled to be turned on and other switch transistors are controlled to be turned off. The equivalent circuit of the driving and rectifying circuit 61 is that a branch where Q3, Q1 and Q9 are located is connected, and a branch where Q2 and Q4 are located is disconnected, and an induced current formed by an induced electromotive force in a loop first flows from a left end of the linear motor to the boost circuit 63 through Q1 and Q9.

Referring to FIG. 6E, FIG. 6E is a schematic diagram of an example of an equivalent circuit of a driving and rectifying circuit 61 when a zero-crossing detector detects that the linear motor generates a negative electromotive force (an electromotive force pointing to a left side of the linear motor is negative, and an electromotive force pointing to a right side of the linear motor is positive).

As shown in FIG. 6E, when Q9 is controlled to be turned on and Q8 is controlled to be turned off, Q2 and Q4 are controlled to be turned on and other switch transistors are controlled to be turned off. The equivalent circuit of the driving and rectifying circuit 61 is that a branch where Q4, Q2 and Q9 are located is connected, and a branch where Q1 and Q3 are located is disconnected, and an induced current formed by an induced electromotive force in a loop first flows from a left end of the linear motor to the boost circuit 63 through Q4 and Q9.

It can be learned that changes of positive and negative induced electromotive forces are detected by the zero-crossing detector to control the circuits to operate in the equivalent circuits shown in FIG. 6D and FIG. 6E respectively, so that a direction of the induced current formed in the loop by the alternating positive and negative induced electromotive forces is always from Q9 to the boost circuit 63, thereby ensuring that a current obtained by subsequent circuits is a positive current, that is, the direction of the current is unchanged, so as to adjust an alternating current generated by the linear motor during damped vibration to a direct current.

In addition, an induced current generated by the linear motor during mechanical vibration will flow to the boost circuit of the energy recovery module through the switch Q9. For descriptions about structures and operating principles of the boost circuit 63 and the energy storage circuit 64, refer to the foregoing description of FIG. 5A. Details are not described herein again.

In conclusion, after the linear motor driving circuit and method according to the embodiments of this application are used, when the linear motor continues to make damped vibration due to inertia after the driver module changes from driving the linear motor to stopping driving the linear motor, the energy recovery module can be controlled to recover electric energy generated by the linear motor during the damped vibration. Then the recovered electric energy is supplied to another low-power module such as a control module, so as to improve power supply efficiency of the electronic device, reduce electric energy losses, and prolong standby time.

In addition, after the linear motor driving circuit and method according to the embodiments of this application are used, an induced electromotive force generated by the linear motor due to inertia forms a loop with the energy recovery circuit, so that the linear motor generates a counter electromotive force that hinders vibration and prevents the linear motor from continuing to vibrate, thereby shortening vibration trailing time of the linear motor, and making a vibration experience effect for a user more straightforward.

An electronic device to which the linear motor according to the embodiments of this application can be applied is described based on the foregoing descriptions about the linear motor driving apparatus, a diagram showing simulation of a voltage of the linear motor circuit, and the structure and the operating principle of the driving circuit of the linear motor according to this application.

In this embodiment of this application, the electronic device to which the linear motor is applied to may be a mobile phone, a camera, a smartwatch, a sports band, a tablet computer, an ultra-mobile personal computer (ultra-mobile personal computer, UMPC), a netbook, a cellular phone, a personal digital assistant (personal digital assistant, PDA), an augmented reality (augmented reality, AR) device, a virtual reality (virtual reality, VR) device, an artificial intelligence (artificial intelligence, AI) device, a wearable device, a vehicle-mounted device, a smart home device, a smart city device, and/or the like. This is not limited in this embodiment of this application.

Figure 7:
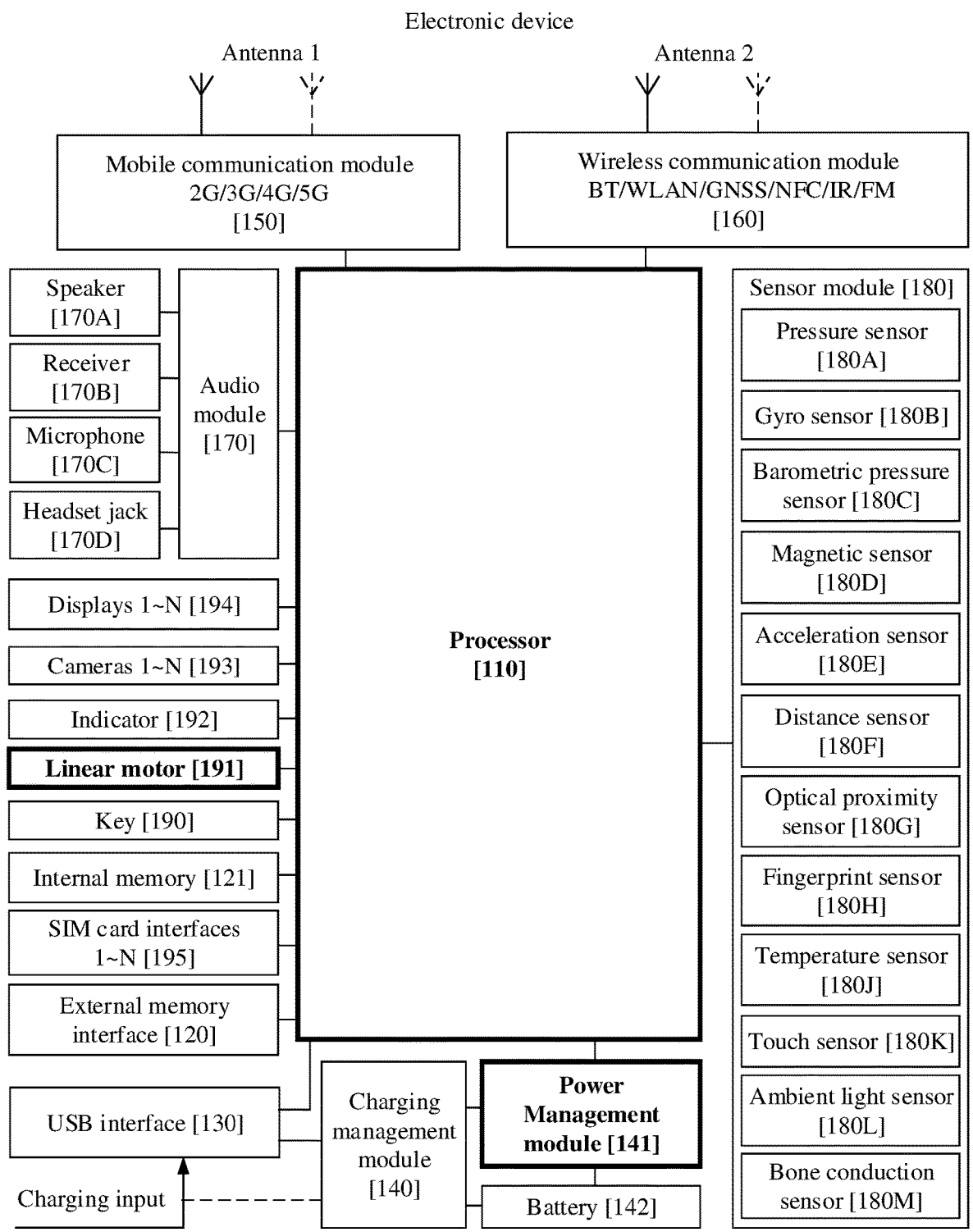
FIG. 7 is a diagram of a hardware architecture of an electronic device using a linear motor according to an embodiment of this application.

With reference to FIG. 7, the following describes software and hardware architectures of an electronic device according to this application. FIG. 7 is a diagram of a hardware architecture of an electronic device using a linear motor according to an embodiment of this application.

As shown in FIG. 7, the electronic device may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a linear motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in this embodiment of this application does not constitute a specific limitation on the electronic device. In some other embodiments of this application, the electronic device may include more or fewer components than those shown in the figure, or combine some components, or split some components, or have different component arrangements. The illustrated components may be implemented by using hardware, software or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent devices, or may be integrated in one or more processors.

The controller may generate an operation control signal based on instruction operation code and a timing signal, to complete control of instruction fetch and instruction execution.

A memory may further be disposed in the processor 110, to store instructions and data. In some embodiments, the memory in the processor 110 is a cache. The memory may store an instruction or data that has just been used or is cyclically used by the processor 110. If the processor 110 needs to use the instructions or the data again, the instructions or the data may be directly invoked from the memory. Therefore, repeated access is avoided, and a waiting time of the processor 110 is reduced, thereby improving system efficiency.

In this embodiment of this application, the processor 110 may call a third application to obtain information on events in a plurality of applications, and detect whether there is a conflict event among the events. If there is a conflict event among the events, a corresponding module such as the display 194, the audio module 170, or the indicator 192 is invoked to output prompt information. For descriptions about the third application and the plurality of applications, refer to the foregoing detailed description. For a specific method for detecting the conflict event, refer to description of a method embodiment below. Details are not described herein.

In this application, the processor 110 may further control the linear motor 191 to vibrate, and control the energy recovery circuit in the linear motor driving circuit to recover energy generated during damped vibration of the linear motor.

For example, when the processor 110 detects that the electronic device has received an incoming call, a message, or an alarm clock, the processor can control the driving circuit in the linear motor driving apparatus to start operation, so as to drive the linear motor 191 to vibrate.

For another example, when the processor 110 detects that the linear motor 191 is driven to vibrate for a time longer than a preset time, or that an incoming call is connected or rejected, or that an alarm clock is turned off, the processor 100 controls the driving circuit in the linear motor driving apparatus to stop driving, and controls the energy recovery circuit to start operation. In this case, the energy recovery module can collect electric energy generated during damped vibration after the linear motor is stopped being driven.

For another example, when electric energy collected by the energy recovery module exceeds preset electric energy, the processor 110 may further control the energy recovery module to supply the collected electric energy to another low-power module.

For circuit structures and operating principles of the linear motor driving apparatus and the energy recovery module, refer to detailed description of foregoing method embodiment. Details are not described herein again.

It may be understood that an interface connection relationship between the modules illustrated in this embodiment of this application is an example for description, and does not constitute a limitation on the structure of the electronic device. In some other embodiments of this application, the electronic device may alternatively use an interface connection mode that is different from those in the foregoing embodiments, or use a combination of a plurality of interface connection modes.

The charging management module 140 is configured to receive a charging input from a charger. The charger may be a wireless charger or a wired charger. In some embodiments of wired charging, the charging management module 140 may receive a charging input of a wired charger by using a USB interface 130. In some embodiments of wireless charging, the charging management module 140 may receive a wireless charging input by using a wireless charging coil of the electronic device. While charging the battery 142, the charging management module 140 may further supply power to the electronic device by using the power management module 141.

The power management module 141 is configured to be connected to the battery 142, the charging management module 140, and the processor 110. The power management module 141 receives an input of the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a quantity of battery cycles, and a battery health status (leakage or impedance). In some other embodiments, the power management module 141 may alternatively be disposed in the processor 110. In some other embodiments, the power management module 141 and the charging management module 140 may alternatively be disposed in a same component.

In this embodiment of this application, the power management module 141 may be configured to control the battery 142 to supply an operating voltage to the linear motor driving apparatus.

The linear motor 191 may generate a vibration prompt. The motor 191 may be configured to provide an incoming call vibration prompt, a new message prompt, and an alarm clock prompt, or may be configured to provide a touch vibration feedback. For example, a touch operation performed on different applications (for example, photographing and audio playback) may correspond to different vibration feedback effects. The motor 191 may also correspond to different vibration feedback effects when touch operations are performed on different areas of the display 194. Different application scenarios (for example, a time reminder, receiving information, an alarm clock, and a game) may also correspond to different vibration feedback effects. A touch vibration feedback effect may further be customized.

Various implementations of this application may be combined randomly to achieve different technical effects.

All or some of the foregoing embodiments may be implemented by using software, hardware, firmware, or any combination thereof. When the embodiments are implemented by using software, all or some of the embodiments may be implemented in a form of a computer program product. The computer program product includes one or more computer instructions. When the computer program instructions are loaded and executed on a computer, a procedure or a function according to this application is completely or partially generated. The computer may be a general-purpose computer, a special-purpose computer, a computer network, or another programmable apparatus. The computer instructions may be stored in a computer-readable storage medium or transmitted from one computer-readable storage medium to another computer-readable storage medium. For example, the computer instructions may be transmitted from one network site, computer, server or data center to another network site, computer, server or data center in a wired (such as a coaxial cable, an optical fiber, or a digital subscriber line (DSL)) or wireless (such as infrared, wireless, or microwave) manner. The computer-readable storage medium may be any available medium accessible by a computer, or a data storage device such as a server or a data center, integrating one or more available media. The available medium may include a magnetic medium (for example, a floppy disk, a hard disk, or a magnetic tape), an optical medium (for example, a DVD), or a semiconductor medium (for example, a solid state disk).

A person of ordinary skill in the art may understand that all or some of the procedures of the methods in the embodiments are implemented. The procedures may be completed by a computer program instructing related hardware. The program may be stored in a computer-readable storage medium. When the program is executed, the procedures in the foregoing method embodiments may be included. The foregoing storage medium includes any medium that can store program code, such as a ROM, a random storage memory RAM, a magnetic disk, or an optical disc.

In conclusion, the foregoing descriptions are only embodiments of the technical solutions of this application, and are not intended to limit the protection scope of this application. Any modifications, equivalent replacements, improvements, or the like made based on the disclosure of this application shall fall within the protection scope of this application.

The foregoing embodiments are merely used to describe the technical solutions of this application, but are not limited thereto. Although this application is described in detail with reference to the foregoing embodiments, a person of ordinary skill in the art should understand that the foregoing embodiments may still modify the technical solutions described in the foregoing embodiments, or perform equivalent replacement on some of the technical features. However, these modifications or replacements do not leave the essence of the corresponding technical solutions out of the scope of the technical solutions in the embodiments of this application.

What is claimed is:

1. A linear motor driving circuit, comprising a control circuit, a driver circuit, a linear motor, and an energy recovery circuit;
   wherein the linear motor is configured to:
      when the control circuit controls the driver circuit to stop driving the linear motor to vibrate, start damped vibration; and
   wherein the control circuit is configured to:
      control the driver circuit to stop driving the linear motor; and
      control the energy recovery circuit to collect electric energy generated by the linear motor during the damped vibration;
   wherein the energy recovery circuit comprises a rectifier circuit and an energy storage circuit;
   wherein the rectifier circuit comprises a plurality of operational amplifiers and a plurality of feedback resistors, and is configured to convert a first voltage generated by the linear motor during the damped vibration into a second voltage, the first voltage is a voltage with alternating positive and negative polarities and a variable amplitude, and the second voltage is a unidirectional pulsating direct current voltage with a constant polarity and a variable amplitude; and
   wherein the energy storage circuit is configured to store the collected electric energy generated by the linear motor during the damped vibration.

2. The linear motor driving circuit according to claim 1, wherein the energy recovery circuit is further configured to:
   after the energy recovery circuit collects the electric energy generated by the linear motor during the damped vibration, supply the collected electric energy to a first circuit, wherein the first circuit comprises the control circuit or a low-power chip.

3. The linear motor driving circuit according to claim 1, wherein the control circuit is further configured to:
   before the control circuit controls the driver circuit to stop driving the linear motor to vibrate, control the driver circuit to drive the linear motor to vibrate.

4. The linear motor driving circuit according to claim 1, wherein:
   the energy recovery circuit further comprises a filter circuit, the filter circuit is configured to convert the second voltage output by the rectifier circuit into a third voltage, a polarity of the third voltage is the same as that of the second voltage, and an amplitude variation coefficient of the third voltage is lower than that of the second voltage; or the energy recovery circuit further comprises a boost circuit, the boost circuit is configured to convert the second voltage into a fourth voltage, and a polarity of the fourth voltage is the same as that of the second voltage, and an amplitude of the fourth voltage is greater than that of the second voltage; or the energy recovery circuit further comprises a filter circuit and a boost circuit, the filter circuit is configured to convert the second voltage output by the rectifier circuit into a third voltage, and wherein:

the boost circuit is configured to convert the third voltage into a fifth voltage, a polarity of the fifth voltage is the same as that of the third voltage, an amplitude of the fifth voltage is greater than that of the third voltage; or the boost circuit is configured to convert the second voltage into a fourth voltage, and the filter circuit is configured to convert the fourth voltage into a sixth voltage, a polarity of the sixth voltage is the same as that of the fourth voltage, and an amplitude variation coefficient of the sixth voltage is lower than that of the fourth voltage.

5. The linear motor driving circuit according to claim 4, wherein:

the rectifier circuit is any one of the following: a full-wave rectifier or a half-wave rectifier;

the energy storage circuit is a capacitor, an inductor, a battery, or a circuit comprising a capacitor and an inductor that are connected in series or in parallel;

the filter circuit is any one of the following: a capacitor filter circuit, an inductor filter circuit, a Pi-type RC filter circuit, a Pi-type LC filter circuit, an active filter circuit, or an electronic filter circuit; and the boost circuit is any one of the following: a boost DC/DC converter, a boost circuit, or a boost charge pump.

6. The linear motor driving circuit according to claim 1, wherein the driver circuit and the rectifier circuit are integrated in a same electronic circuit.

7. The linear motor driving circuit according to claim 1, wherein the driver circuit and the rectifier circuit are independently disposed in different electronic circuits.

8. A method, applied to a linear motor driving circuit comprising a control circuit, a driver circuit, a linear motor, and an energy recovery circuit, and the method comprising:

controlling, by the control circuit, the driver circuit to stop driving the linear motor to vibrate, wherein the linear motor starts damped vibration after stopping being driven; and controlling, by the control circuit, the energy recovery circuit to collect electric energy generated by the linear motor during the damped vibration;

wherein the energy recovery circuit comprises a rectifier circuit and an energy storage circuit, and the rectifier circuit comprises a plurality of operational amplifiers and a plurality of feedback resistors; and wherein controlling, by the control circuit, the energy recovery circuit to collect the electric energy generated by the linear motor during the damped vibration comprises:

converting, by the rectifier circuit, a first voltage generated by the linear motor during the damped vibration into a second voltage, wherein the first voltage is a voltage with alternating positive and negative polarities and a variable amplitude, and the second voltage is a unidirectional pulsating direct current voltage with a constant polarity and a variable amplitude; and wherein the method further comprises:

storing, by the energy storage circuit, the collected electric energy generated by the linear motor during the damped vibration.

9. The method according to claim 8, wherein after the energy recovery circuit collects the electric energy generated by the linear motor during the damped vibration, the method further comprises:

supplying, by the energy recovery circuit, the collected electric energy to a first circuit, wherein the first circuit comprises the control circuit or a low-power chip.

10. The method according to claim 8, wherein before controlling, by the control circuit, the driver circuit to stop driving the linear motor to vibrate, the method further comprises:

controlling, by the control circuit, the driver circuit to start, and driving, by the driver circuit, the linear motor to vibrate.

11. The method according to claim 8, wherein:

the energy recovery circuit further comprises a filter circuit, and the filter circuit converts the second voltage output by the rectifier circuit into a third voltage, a polarity of the third voltage is the same as that of the second voltage, and an amplitude variation coefficient of the third voltage is lower than that of the second voltage; or the energy recovery circuit further comprises a boost circuit, and the boost circuit converts the second voltage into a fourth voltage, a polarity of the fourth voltage is the same as that of the second voltage, and an amplitude of the fourth voltage is greater than that of the second voltage; or the energy recovery circuit further comprises a filter circuit and a boost circuit, the filter circuit converts the second voltage output by the rectifier circuit into a third voltage, and wherein:

the boost circuit converts the third voltage into a fifth voltage, a polarity of the fifth voltage is the same as that of the third voltage, and an amplitude of the fifth voltage is greater than that of the third voltage; or the boost circuit converts the second voltage into a fourth voltage, the filter circuit converts the fourth voltage into a sixth voltage, a polarity of the sixth voltage is the same as that of the fourth voltage, and an amplitude variation coefficient of the sixth voltage is lower than that of the fourth voltage.

12. The method according to claim 11, wherein:

the rectifier circuit is any one of the following: a full-wave rectifier or a half-wave rectifier;

the energy storage circuit is a capacitor, an inductor, a battery, or a circuit comprising a capacitor and an inductor that are connected in series or in parallel;

the filter circuit is any one of the following: a capacitor filter circuit, an inductor filter circuit, a Pi-type RC filter circuit, a Pi-type LC filter circuit, an active filter circuit, or an electronic filter circuit; and the boost circuit is any one of the following: a boost DC/DC converter, a boost circuit, or a boost charge pump.

13. The method according to claim 8, wherein the driver circuit and the rectifier circuit are integrated in a same electronic circuit or independently disposed in different electronic circuits.

14. A non-transitory computer-readable storage medium, comprising an instruction, wherein when the instruction is run on the linear motor driving circuit, the linear motor driving circuit is enabled to perform the method according to claim 8.

15. An electronic device, wherein the electronic device comprises:
   one or more processors;
   one or more memories; and
   a linear motor driving circuit, comprising a control circuit, a driver circuit, a linear motor, and an energy recovery circuit; and
   wherein the one or more memories are coupled to the one or more processors, the one or more memories are configured to store computer program code, the computer program code comprises a computer instruction, and when the computer instruction is executed by the one or more processors, the electronic device is enabled to:
      control the driver circuit to stop driving the linear motor to vibrate, wherein the linear motor starts damped vibration after stopping being driven; and
      control the energy recovery circuit to collect electric energy generated by the linear motor during the damped vibration;
   wherein the energy recovery circuit comprises a rectifier circuit and an energy storage circuit;
   wherein the rectifier circuit comprises a plurality of operational amplifiers and a plurality of feedback resistors, and is configured to convert a collected first voltage generated by the linear motor during the damped vibration into a second voltage, the first voltage is a voltage with alternating positive and negative polarities and a variable amplitude, and the second voltage is a unidirectional pulsating direct current voltage with a constant polarity and a variable amplitude; and
   wherein the energy storage circuit is configured to store the collected electric energy generated by the linear motor during the damped vibration.

16. The electronic device according to claim 15, wherein the energy recovery circuit is further configured to:
   after the energy recovery circuit collects the electric energy generated by the linear motor during the damped vibration, supply the collected electric energy to a first circuit, wherein the first circuit comprises the control circuit or a low-power chip.

17. The electronic device according to claim 15, wherein when the computer instruction is executed by the one or more processors, the electronic device is enabled to:
   before controlling the driver circuit to stop driving the linear motor to vibrate, control the driver circuit to drive the linear motor to vibrate.

18. The electronic device according to claim 15, wherein:
   the rectifier circuit is any one of the following: a full-wave rectifier or a half-wave rectifier.

19. The electronic device according to claim 15, wherein:
   the energy storage circuit is a capacitor, an inductor, a battery, or a circuit comprising a capacitor and an inductor that are connected in series or in parallel.

20. The electronic device according to claim 15, wherein the driver circuit and the rectifier circuit are integrated in a same electronic circuit.

* * * * *